(12) United States Patent
Karaivanov et al.

(10) Patent No.: US 12,165,146 B2
(45) Date of Patent: *Dec. 10, 2024

(54) SYSTEM AND METHOD FOR MANAGING MERCHANT TERMS AND CONDITIONS APPLICABLE TO A PAYMENT TRANSACTION

(71) Applicant: Worldpay, LLC, Symmes Township, OH (US)

(72) Inventors: Stefan K. Karaivanov, Newton, MA (US); Thomas E. Rafferty, Las Vegas, NV (US)

(73) Assignee: Worldpay, LLC, Symmes Township, OH (US)

( * ) Notice: Subject to any disclaimer, the term of this patent is extended or adjusted under 35 U.S.C. 154(b) by 186 days.

This patent is subject to a terminal disclaimer.

(21) Appl. No.: 17/218,382

(22) Filed: Mar. 31, 2021

(65) Prior Publication Data
US 2021/0217003 A1 Jul. 15, 2021

Related U.S. Application Data

(63) Continuation of application No. 14/580,280, filed on Dec. 23, 2014, now Pat. No. 10,997,593.

(51) Int. Cl.
*G06Q 20/38* (2012.01)
*G06Q 20/40* (2012.01)
(52) U.S. Cl.
CPC ......... *G06Q 20/389* (2013.01); *G06Q 20/405* (2013.01)

(58) Field of Classification Search
None
See application file for complete search history.

(56) References Cited

U.S. PATENT DOCUMENTS

| | | | |
|---|---|---|---|
| 8,706,631 B2 * | 4/2014 | Gupta | G06Q 30/0603 455/406 |
| 2005/0071226 A1 * | 3/2005 | Nguyen | G06Q 30/0231 705/14.31 |
| 2010/0274723 A1 * | 10/2010 | Joao | G06Q 30/06 705/44 |
| 2011/0125619 A1 | 5/2011 | Talbert et al. | |
| 2013/0238413 A1 | 9/2013 | Carlson et al. | |
| 2013/0282443 A1 * | 10/2013 | Bal | G06Q 30/0609 705/7.36 |
| 2013/0297492 A1 * | 11/2013 | Ertresvaag | G06Q 20/389 705/39 |
| 2014/0006264 A1 * | 1/2014 | Powell | G06Q 20/407 705/39 |

(Continued)

OTHER PUBLICATIONS

Georgios Zokos, Legal Problems in Cyberspace, 2002, Emerald Group Publishing Limited, Managerial Law 44.5, (pp. 45-102) (Year: 2002).*

*Primary Examiner* — Benjamin S Brindley
(74) *Attorney, Agent, or Firm* — Bookoff McAndrews, PLLC

(57) ABSTRACT

Systems and methods are provided for managing a merchant's set of terms and conditions that are applicable to a payment vehicle transaction. When a chargeback for the payment vehicle transaction is initiated and disputed, the applicable set of terms and conditions can be transmitted to an issuer financial institution on behalf of the merchant as part of the dispute process.

17 Claims, 4 Drawing Sheets

(56) References Cited

U.S. PATENT DOCUMENTS

| | | |
|---|---|---|
| 2014/0156436 A1 | 6/2014 | McClennen et al. |
| 2015/0220914 A1* | 8/2015 | Purves ................ G06Q 20/405 705/41 |

* cited by examiner

SYSTEM AND METHOD FOR MANAGING MERCHANT TERMS AND CONDITIONS APPLICABLE TO A PAYMENT TRANSACTION

CROSS-REFERENCE TO RELATED APPLICATION(S)

This patent application is a continuation of and claims the benefit of priority to U.S. Nonprovisional patent application Ser. No. 14/580,280, filed on Dec. 23, 2014, the entirety of which is incorporated herein by reference.

TECHNICAL FIELD

The systems and methods described below relate generally to the field of merchant terms and conditions for a payment vehicle transaction. More particularly, the systems and methods relate to the field of storing and providing a merchant's terms and conditions to an issuer financial institution on behalf of the merchant for a chargeback dispute.

BACKGROUND

A chargeback is the return of funds to an account holder forcibly initiated by an issuing bank of the instrument used by the account holder to settle a debt. Specifically, a chargeback is the reversal of a prior outbound transfer of funds from an account holder's bank account, line of credit, or credit card. An account holder may initiate a chargeback by contacting their issuing bank, and filing a substantiated complaint regarding one or more debit items on their statement. The threat of forced reversal of funds provides merchants with an incentive to provide quality products, helpful customer service, and timely refunds as appropriate. Chargebacks also provide a means for reversal of unauthorized transfers due to identity theft. Chargebacks can also occur as a result of friendly fraud, where the transaction was authorized by the consumer but the consumer later attempts to fraudulently reverse the charges. Chargebacks can be financially detrimental to the merchant and can affect the ability of the merchant to accept certain payment vehicles in the future.

When a chargeback is initiated, the merchant has an opportunity to dispute the chargeback to an issuer financial institution. As part of the dispute process, the issuer financial institution can require documentary evidence from the merchant. As part of that documentary evidence, the issuer financial institution can require a copy of the merchant's set of transaction terms and conditions that were in effect for the disputed payment vehicle transaction.

SUMMARY

In an embodiment, the present disclosure is directed, in part, to a computer-implemented method of processing of a payment vehicle transaction submitted by a merchant computing system of a merchant. The computer-implement method comprises receiving, at a payment processing computing system from a merchant computing system, transaction data for a payment vehicle transaction, wherein a set of transaction terms and conditions of the merchant apply to the payment vehicle transaction. The method further comprises storing, in a transaction database communicably coupled to the payment processing computing system, a transaction record comprising the transaction data and storing, in a terms and conditions database communicably coupled to the payment processing computing system, the set of transaction terms and conditions of the merchant that apply to the payment vehicle transaction. The method further includes linking the set of transaction terms and conditions to the transaction record.

In an embodiment, the present disclosure is directed, in part, to a non-transitory computer readable medium having instructions stored thereon which when executed by a processor cause the processor to receive transaction data for a payment vehicle transaction, wherein a set of transaction terms and conditions of a merchant apply to the payment vehicle transaction. The instructions stored on the computer readable medium when executed also cause the processor to store, in a transaction database, a transaction record comprising the transaction data. The instructions stored on the computer readable medium when executed also cause the processor to store, in a terms and conditions database, the set of transaction terms and conditions of the merchant for the payment vehicle transaction and link the set of transaction terms and conditions to the transaction record.

In one embodiment, the present disclosure is directed, in part, to a system for processing of a payment vehicle transaction submitted by a merchant computing system of a merchant. The system comprises means for receiving from a merchant computing system transaction data for a payment vehicle transaction, wherein a set of transaction terms and conditions of the merchant apply to the payment vehicle transaction. The system comprises means for storing a transaction record comprising the transaction data and means for storing the set of transaction terms and conditions of the merchant for the payment vehicle transaction. The system comprises means for linking the set of transaction terms and conditions to the transaction record.

BRIEF DESCRIPTION OF THE DRAWINGS

It is believed that certain embodiments will be better understood from the following description taken in conjunction with the accompanying drawings, in which like references indicate similar elements and in which.

DETAILED DESCRIPTION

Figure 1:
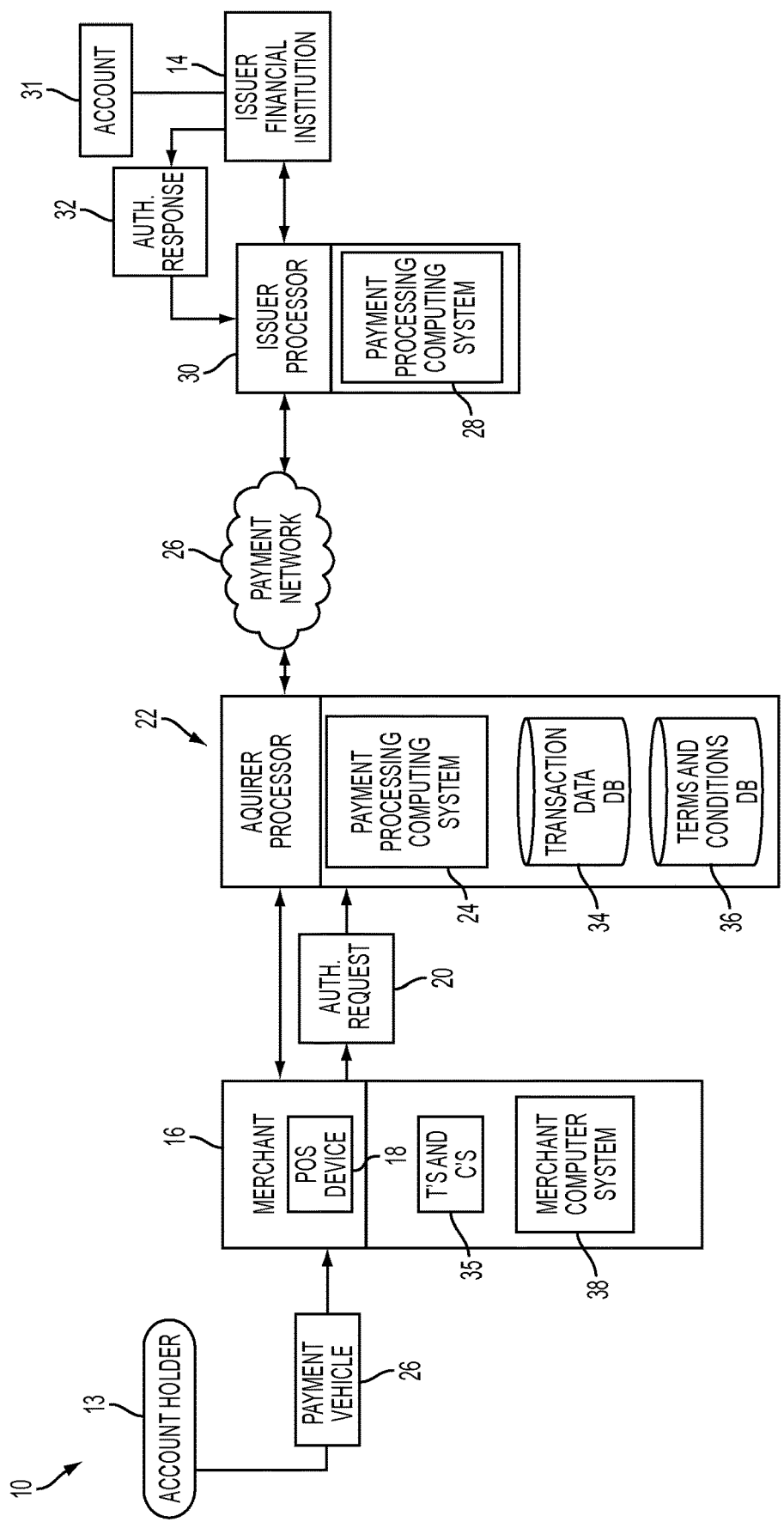
FIG. 1 depicts a system according to one embodiment which includes a merchant that sell products and/or services and various entities within a payment ecosystem.

Various non-limiting embodiments of the present disclosure will now be described to provide an overall understanding of the principles of the structure, function, and use of systems and methods disclosed herein for providing a merchant's set of terms and conditions to an issuer financial institution on behalf of the merchant. One or more examples of these non-limiting embodiments are illustrated in the selected examples disclosed and described in detail with reference made to FIGS. 1-4 in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments.

Such modifications and variations are intended to be included within the scope of the present disclosure.

The systems, apparatuses, devices, and methods disclosed herein are described in detail by way of examples and with reference to the figures. The examples discussed herein are examples only and are provided to assist in the explanation of the apparatuses, devices, systems and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures or characteristics may be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context. It should be noted that although for clarity and to aid in understanding some examples discussed herein might describe specific features or functions as part of a specific component or module, or as occurring at a specific layer of a computing device (for example, a hardware layer, operating system layer, or application layer), those features or functions may be implemented as part of a different component or module or operated at a different layer of a communication protocol stack. Those of ordinary skill in the art will recognize that the systems, apparatuses, devices, and methods described herein can be applied to, or easily modified for use with, other types of equipment, can use other arrangements of computing systems such as client-server distributed systems, and can use other protocols, or operate at other layers in communication protocol stacks, than are described.

For simplicity, the description that follows will be provided by reference to a "payment vehicle," which generally refers to any type of financial alternative to currency. As is to be clear to those skilled in the art, no aspect of the present disclosure is specifically limited to a specific type of payment vehicle. Therefore, it is intended that the following description encompasses the use of the present disclosure with many other forms of financial alternatives to currency, including credit cards, debit cards, smart cards, single-use cards, pre-paid cards, electronic currency (such as might be provided through a cellular telephone or personal digital assistant), and the like.

FIG. 1 depicts a block diagram of an example payment system 10. In the example payment system 10, a payment vehicle 12 (e.g., a credit card) can be issued to an account holder 13 by an issuer financial institution 14. The issuer financial institution 14 can be any of a variety of financial institutions that is capable of issuing a payment vehicle to an account holder. The payment vehicle 12 can be used to pay a merchant 16 for a payment vehicle transaction at a merchant point of sale (POS) device 18. For some transactions, the account holder 13 will have to accept or otherwise agree to certain terms and conditions 35 before proceeding with the transaction.

The merchant POS device 18 can be any device that facilitates receipt of a payment vehicle for payment of a purchase, such as for example, a POS terminal or a web interface. The merchant POS device 18 can send an authorization request 20 for the payment vehicle transaction to an acquirer processor 22 that processes payment vehicle transactions for the merchant 16. The authorization request 20 can include identifying information from the payment vehicle 12, such as a BIN number, an expiration date, and a first and last name of the account holder, for example. The authorization request 20 can also include identifying information from the purchase such as an amount and identifying information from the merchant POS device 18 and/or the merchant 16, for example. A payment processing computing system 24 at the acquirer processor 22 can receive the authorization request 20. The payment processing computing system 24 can translate the authorization request 20, if necessary, and can provide the authorization request 20 to a payment network 26. The payment network 26 can be, for example, a network of a credit card association affiliated with the payment vehicle 26. Non-limiting examples of credit card associations include VISA, MASTERCARD, DISCOVER, and AMERICAN EXPRESS. The authorization request 20 can then be provided to a payment processing computing system 28 at an issuer processor 30. In response to receiving the authorization request, the payment processing computing system 28 can provide the authorization request 20 to the issuer financial institution 14. Using information from the authorization request, the issuer financial institution 14 can associate the payment vehicle transaction with an account 31 of the account holder 13 held by the issuer financial institution 14. The issuer financial institution 14 can then send an authorization response 32 which can either approve or deny the transaction. The authorization response 32 can be provided to the payment processing computing system 28 at the issuer processor 30 and then provided to the payment network 26. The authorization response 32 can then be provided to the payment processing computing system 24 at the acquirer processor 22. Upon receiving the authorization response 32, the payment processing computing system 24 can send either an approval message or a denial message to the merchant POS device 18 to complete the payment vehicle transaction. If the payment vehicle transaction is approved, it can be posted to the account holder's account 31 and reconciled later with the account holder 13 and the merchant 16.

When a transaction is initiated, the transaction can be stored as a transaction record and can comprise transaction data. Transaction records can be stored in one or more locations within the system 10. In one embodiment, the transaction record can be stored within a transaction database 34 communicably coupled to the payment processing computing system 24. The transaction data can be received by the transaction database 34 from various sources, such as the merchant POS device 18, the merchant 16, the acquirer processor 22, and so on. A plurality of transaction parameters associated with the payment vehicle transaction can be stored in each transaction record which can generally be used for settlement and financial recordkeeping. While the transaction parameters stored in each transaction record can vary, example transaction parameters can include, without limitation, account number, card number, payment vehicle information, product information (such as product type, product serial number, and so forth), transaction amount, loyalty account information, merchant information, transaction amount, transaction date, transaction time, whether the transaction was a "card present" transaction, and so on.

It is to be appreciated that once a completed payment vehicle transaction is deemed to be fraudulent, or for other suitable reasons, the issuer financial institution 14 has an opportunity to initiate a chargeback to prevent the account holder 13 from being erroneously charged for a fraudulent transaction by the merchant 16. Additional details regarding chargebacks and chargeback procedures can be found in "Chargeback Management Guidelines for Visa Merchants," copyright 2011, published by VISA and available at usa.visa.com/download/merchants/chargeback-management-guidelines-for-visa-merchants.pdf and "chargeback Guide," dated 26 Apr. 2013, published by MASTERCARD WORLDWIDE and available at www.mastercard.com/us/merchant/pdf/TB_CB_Manual.pdf, the entireties of which are incorporated herein by reference. While some chargebacks may be warranted (such as in the result of identity theft), other chargebacks may be a result of fraudulent activity on behalf of an account holder or other entity, sometimes referred to as "friendly fraud." Once the chargeback is initiated, the merchant 16 typically has an opportunity to dispute the chargeback to the issuer financial institution 14. As part of the dispute process, the issuer financial institution 14 can require documentary evidence from merchant 16. As part of that documentary evidence, the issuer financial institution 14 can require a copy of the merchant's set of transaction terms and conditions that were in effect for the disputed payment vehicle transaction. However, since a merchant's set of terms and conditions are subject to change and since certain merchants may have a variety of different set of terms and conditions (i.e., different set of terms and conditions for different categories of transactions), retrieving and submitting the correct set of terms and conditions for a given payment vehicle transaction can require significant time and effort and can thus be unduly burdensome for the merchant 16.

In accordance with certain embodiments, systems, apparatus, and methods are provided to provide a merchant's set of terms and conditions to an issuer financial institution on behalf of the merchant. As used herein, set of terms and conditions generally refers to any memorialization of the obligations and conditions as between an account holder and a merchant for conducting a payment vehicle transaction. In one embodiment, the acquirer processor 22 can facilitate provision of the merchant's set of terms and conditions to the issuer financial institution 14. As illustrated in FIG. 1, a set of terms and conditions 35 can be maintained at the merchant 16. The set of terms and conditions 35 can be provided to the acquirer processor 22 by the merchant 16 and stored within a terms and conditions database 36 communicably coupled to the payment processing computing system 24 of the acquirer processor 22.

When a payment vehicle transaction is initiated by the account holder at the POS device 18, the set of terms and conditions 35 of the merchant 16 at the time of the payment vehicle transaction apply to the payment vehicle transaction. The set of terms and conditions 35 applying to a payment vehicle transaction are also stored in the terms and conditions database 36. The terms and conditions stored within the terms and conditions database 36 can be linked to the transaction record that is stored within the transaction data database 34 for the payment vehicle transaction. If a chargeback is initiated for the payment vehicle transaction, and the chargeback is disputed by the merchant 16, the acquirer processor 22 can reference the transaction record for the disputed payment vehicle transaction that is stored in the transaction data database 34. Based on the link provided by the transaction record, the acquirer processor 22 can then retrieve the appropriate set of terms and conditions 35 from the terms and conditions database 36 that were applicable to the disputed transaction. Once received from the terms and conditions database 36, the applicable set of terms and conditions 35 can be transmitted to the issuer financial institution 14, or other requesting entity, on behalf of the merchant 16. The overhead for storing, selecting, and transmitting the appropriate set of terms and conditions 35 can accordingly be borne by the acquirer processor 22 thus saving the merchant 16 time and expense.

The acquirer processor 22 can receive the set of terms and conditions 35 from a merchant computer system 38 of the merchant 16 in any of a variety of suitable manners. In one embodiment, the merchant computer system 38 can maintain (i.e., host) the set of terms and conditions 35 at a network address. The merchant 16 can update or modify the terms and conditions 35 available at the network address, as needed. The merchant 16 can provide the network address to the acquirer processor 22. Subsequent to receiving the network address, the acquirer processor 22 can access the network address through a network (e.g., the internet) to retrieve and store the set of terms and conditions 35 within the terms and conditions database 36. Accordingly, as the terms and conditions 35 available at the network address are modified over time, the acquirer processor 22 has the ability to obtain up-to-date versions of the terms and conditions 35. The set of terms and conditions 35 can be provided as any of a variety of data files, such as a text file or an HTML file, for example, and can be maintained at any of a variety of network addresses such as at a web address, an IP address, and/or a Uniform Resource Locator, for example.

In an alternative embodiment, the acquirer processor 22 can retrieve the set of terms and conditions 35 from the merchant computer system 38 through accessing the merchant's website and harvesting/extracting (i.e., scraping) the set of terms and conditions 35 from the website. In such an embodiment, the merchant 16 can be a passive participant in the retrieval of the set of terms and conditions 35 by the acquirer processor 22.

When the merchant's set of terms and conditions 35 are updated, the acquirer processor 22 can receive the new version of the set of terms and conditions 35 and can store the updated set of terms and conditions 35 within the terms and conditions database 36. The acquirer processor 22 can still maintain the previous versions of set of terms and conditions 35 in the terms and conditions database 36, as these previous versions are applicable to transactions that occurred before the merchant updated the terms and conditions 35. In one embodiment, the acquirer processor 22 can periodically (e.g., daily) access the merchant's network address and retrieve the current set of terms and conditions from the merchant 16. The acquirer processor 22 can compare the retrieved set of terms and conditions to the current set of terms and conditions stored within the terms and conditions database 36. If the retrieved set of terms and conditions is different from the current set of terms and conditions, the retrieved set of terms and conditions can be stored in the terms and conditions database 36. If the retrieved set of terms and conditions is the same as the current set of terms and conditions, the current set of terms and conditions can remain the terms and conditions database 36 as the most recent version. In one embodiment, a complete set of terms and conditions can be stored within the terms and conditions database 36 each time the set of terms and conditions is updated. In another embodiment, only the differences between the updated set of terms and conditions and the current set of terms and conditions are stored within the terms and conditions database 36 each time the set of terms and conditions is updated.

In another embodiment, for each transaction initiated at the merchant 16, the acquirer processor 22 can access the network address in response to receiving the transaction data from the POS device 18, can retrieve the set of terms and conditions that applies to the purchase transaction and can store the set of terms and conditions in the terms and conditions database 36. In such an embodiment, each transaction record is associated with its own set of terms and conditions within the terms and conditions database 36 irrespective of whether duplicate set of terms and conditions are being stored in the terms and conditions. As a result, the transaction records can be less susceptible to becoming associated with an incorrect set of terms and conditions (e.g., due to failure of the merchant 16 to update the terms and conditions database 36).

In one embodiment, the transaction record can include a terms and conditions identifier field that facilitates linking of the transaction record to the appropriate set of terms and conditions. When the transaction record is stored in the transaction data database 34, the terms and conditions identifier field can be populated with information that identifies the particular set of terms and conditions stored in the terms and conditions database 36 that applies to the purchase transaction. If a chargeback is initiated and disputed for a purchase transaction, the set of terms and conditions associated with that purchase transaction can be identified and retrieved from terms and conditions database 36 based upon the information in the terms and conditions identifier field.

Figure 2:
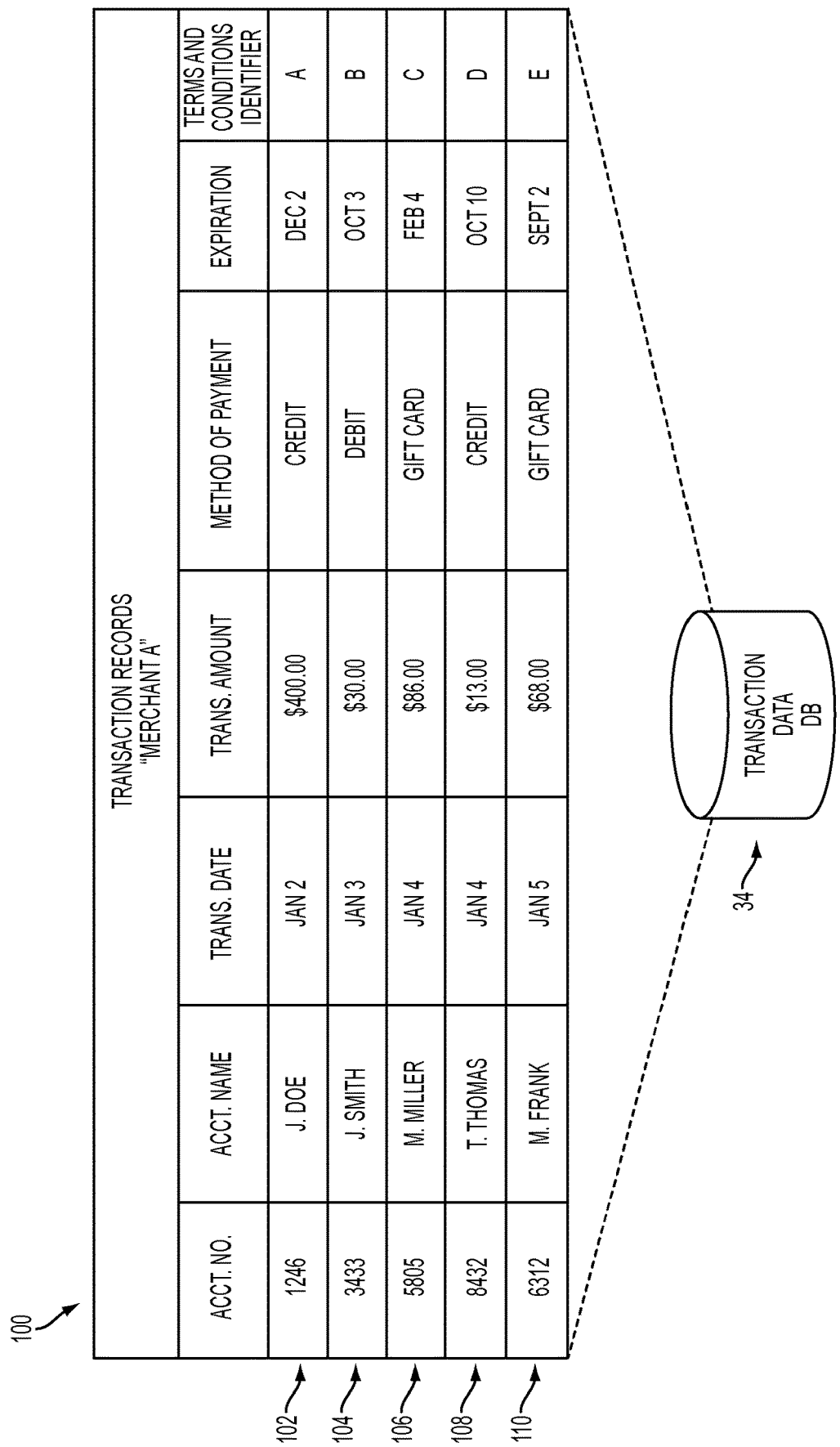
FIG. 2 schematically depicts a collection of example transaction records stored within a transaction data database.

FIG. 2 is a schematic representation of example transaction data 100 stored within the transaction database 34 (FIG. 1) for the merchant A, which can be the merchant 16 shown in FIG. 1. The transaction data can comprise various transaction records 102, 104, 106, 108, 110. As illustrated, each transaction record 102, 104, 106, 108, 110 can include a terms and conditions field. Example transaction parameters of the transaction records 102, 104, 106, 108, 110 are shown to include an account number, account name, a transaction date, a transaction amount, a method of payment and an expiration date of the payment vehicle. As it to be readily appreciated, a wide variety of additional transaction parameters can additionally or alternatively be stored within each transaction record.

In an alternative embodiment, the transaction record can be linked to the appropriate set of terms and conditions based upon the date, time, and merchant information stored in the transaction record. In such an embodiment, the set of terms and conditions can be time-stamped when it is stored in the terms and condition database 36. If a chargeback is initiated and disputed for the purchase transaction, the date, time, and merchant information from the transaction record can be identified. The set of terms and condition for the merchant that was in effect for the data and time of the purchase transaction can be retrieved from the terms and conditions database 36 based upon its time-stamp.

Figure 3:
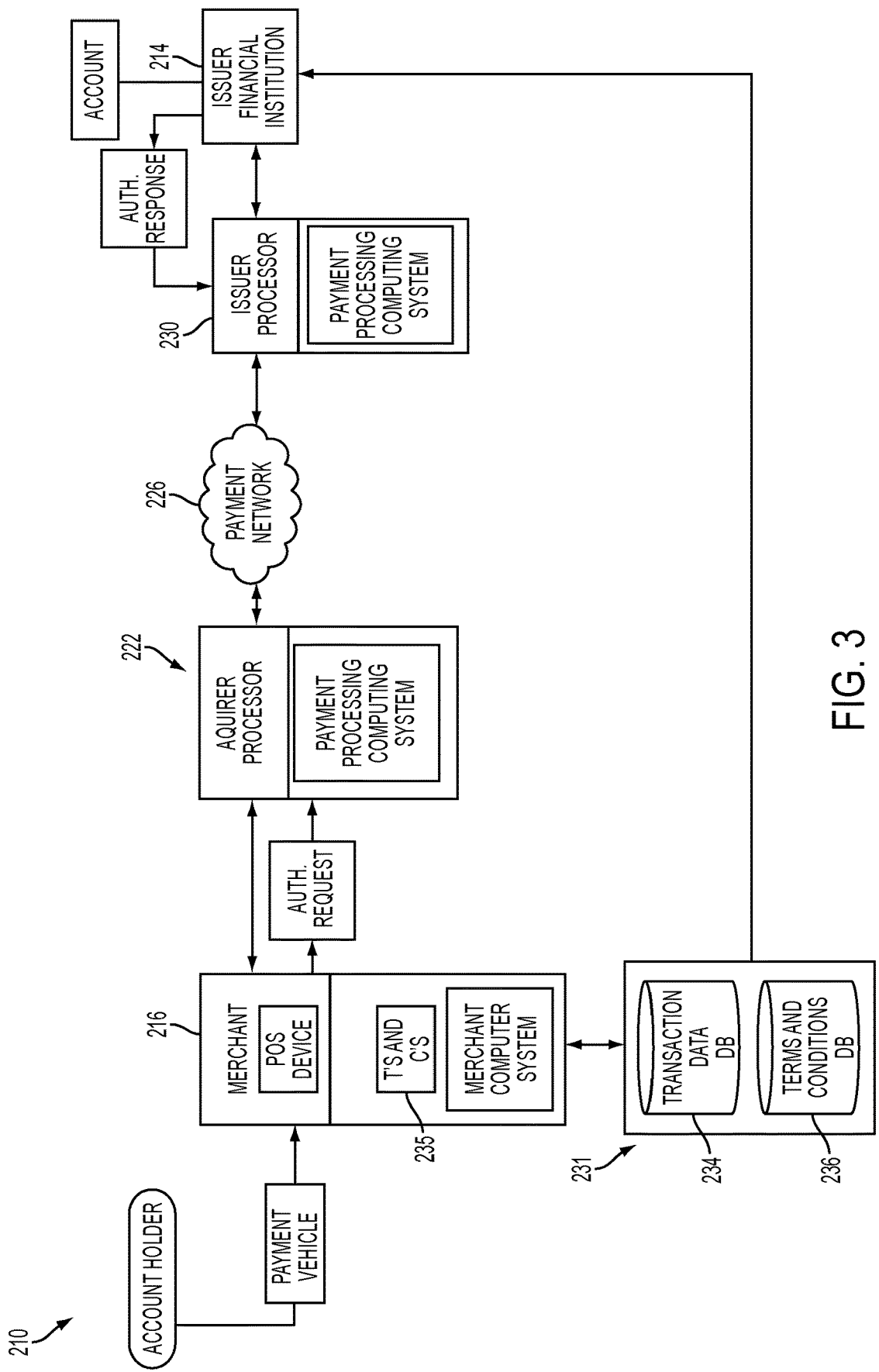
FIG. 3 depicts a system according to another embodiment which includes a merchant that sell products and/or services and various entities within a payment ecosystem.

An alternative embodiment of a payment system 200 is shown in FIG. 3. The payment system 200 is similar to in many respects, or the same as, the payment system 10 of FIG. 1. For example, the payment system 200 can include an issuer financial institution 214, a merchant 216, an acquirer processor 222, a payment network 226, and an issuer processor 230. However, the payment system 200 can include a third party repository 231 that comprises a transaction data database 234 and a terms and conditions database 236. In such an embodiment, the third party repository 231 can receive a set of terms and conditions 235 from the merchant 216 and store them the in the terms and conditions database 234. When a transaction is initiated, the third party repository 231 can receive the transaction data and can store a transaction record that comprises the transaction data within the transaction data database 236. The third party repository 231 can link the transaction record to the appropriate set of terms and conditions stored in the transaction data database 234. If a chargeback is initiated and disputed, the third party repository 231 can transmit the appropriate set of terms and conditions to the issuer financial institution on behalf of the merchant 216.

Figure 4:
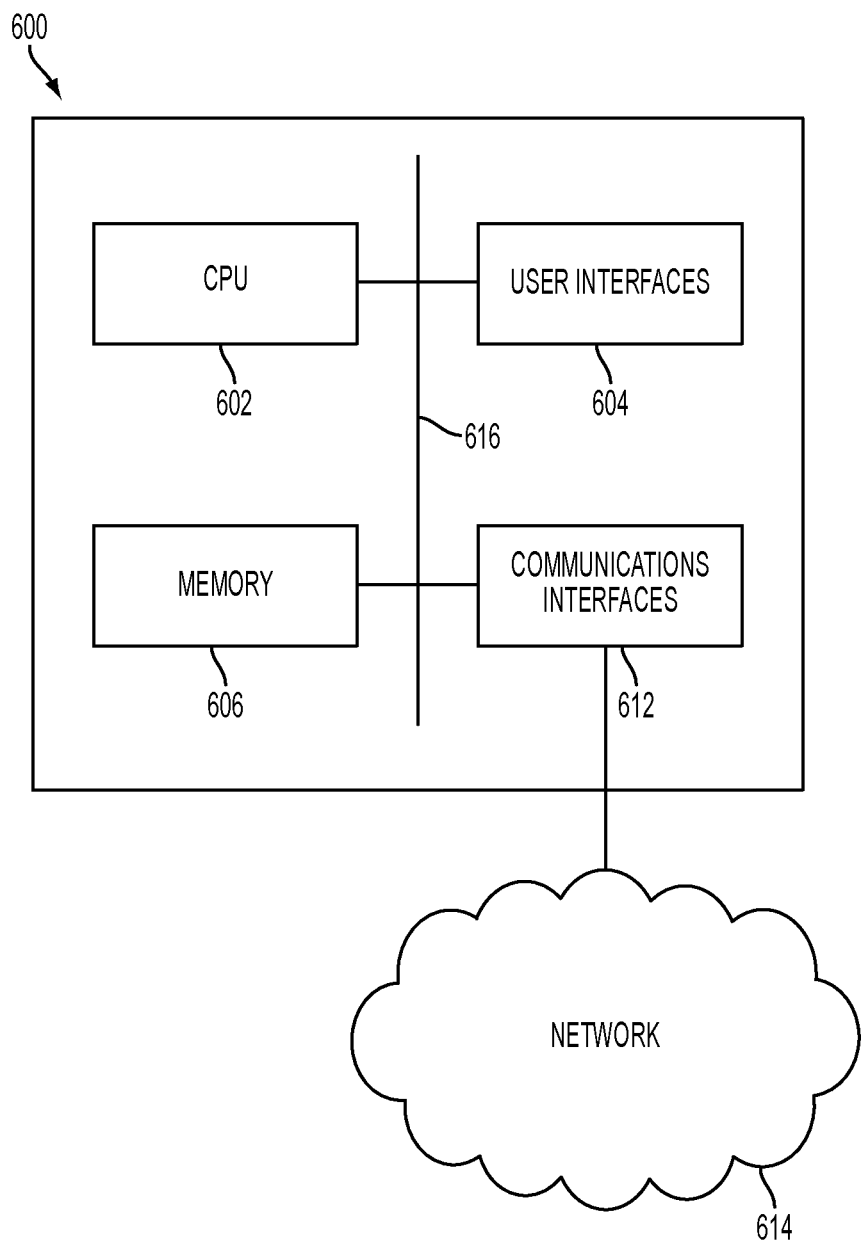
FIG. 4 depicts an example computing device.

The processes described above can be performed on or between one or more computing devices 600. Referring now to FIG. 4, an example computing device 600 is presented. A computing device 600 can be a server, a computing device that is integrated with other systems or subsystems, a mobile computing device, a cloud-based computing capability, and so forth. The computing device 600 can be any suitable computing device as would be understood in the art, including without limitation, a custom chip, an embedded processing device, a tablet computing device, a point of sale device 18, a payment processing computer system 24, a payment processing computer system 28, a personal data assistant (PDA), a desktop, a laptop, a microcomputer, a minicomputer, a server, a mainframe, or any other suitable programmable device. In various embodiments disclosed herein, a single component can be replaced by multiple components and multiple components can be replaced by a single component to perform a given function or functions.

Except where such substitution would not be operative, such substitution is within the intended scope of the embodiments.

The computing device 600 includes a processor 602 that can be any suitable type of processing unit, for example a general purpose central processing unit (CPU), a reduced instruction set computer (RISC), a processor that has a pipeline or multiple processing capability including having multiple cores, a complex instruction set computer (CISC), a digital signal processor (DSP), an application specific integrated circuits (ASIC), a programmable logic devices (PLD), and a field programmable gate array (FPGA), among others. The computing resources can also include distributed computing devices, cloud computing resources, and virtual computing resources in general.

The computing device 600 also includes one or more memories 606, for example read only memory (ROM), random access memory (RAM), cache memory associated with the processor 602, or other memories such as dynamic RAM (DRAM), static ram (SRAM), programmable ROM (PROM), electrically erasable PROM (EEPROM), flash memory, a removable memory card or disk, a solid state drive, and so forth. The computing device 600 also includes storage media such as a storage device that can be configured to have multiple modules, such as magnetic disk drives, floppy drives, tape drives, hard drives, optical drives and media, magneto-optical drives and media, compact disk drives, Compact Disk Read Only Memory (CD-ROM), Compact Disk Recordable (CD-R), Compact Disk Rewritable (CD-RW), a suitable type of Digital Versatile Disk (DVD) or BluRay disk, and so forth. Storage media such as flash drives, solid state hard drives, redundant array of individual disks (RAID), virtual drives, networked drives and other memory means including storage media on the processor 602, or memories 606 are also contemplated as storage devices. It can be appreciated that such memory can be internal or external with respect to operation of the disclosed embodiments. It can be appreciated that certain portions of the processes described herein can be performed using instructions stored on a computer-readable medium or media that direct a computer system to perform the process steps. Non-transitory computer-readable media, as used herein, comprises all computer-readable media except for transitory, propagating signals.

Network and communication interfaces 612 can be configured to transmit to, or receive data from, other computing devices 600 across a network 614. The network and communication interfaces 612 can be an Ethernet interface, a radio interface, a Universal Serial Bus (USB) interface, or any other suitable communications interface and can include receivers, transmitter, and transceivers. For purposes of clarity, a transceiver can be referred to as a receiver or a transmitter when referring to only the input or only the output functionality of the transceiver. Example communication interfaces 612 can include wired data transmission links such as Ethernet and TCP/IP. The communication interfaces 612 can include wireless protocols for interfacing with private or public networks 614. For example, the network and communication interfaces 612 and protocols can include interfaces for communicating with private wireless networks such as a WiFi network, one of the IEEE 802.11x family of networks, or another suitable wireless network. The network and communication interfaces 612 can include interfaces and protocols for communicating with public wireless networks 612, using for example wireless protocols used by cellular network providers, including Code Division Multiple Access (CDMA) and Global System for Mobile Communications (GSM). A computing device 600 can use network and communication interfaces 612 to communicate with hardware modules such as a database or data store, or one or more servers or other networked computing resources. Data can be encrypted or protected from unauthorized access.

In various configurations, the computing device 600 can include a system bus 616 for interconnecting the various components of the computing device 600, or the computing device 600 can be integrated into one or more chips such as programmable logic device or application specific integrated circuit (ASIC). The system bus 616 can include a memory controller, a local bus, or a peripheral bus for supporting input and output devices 604, and communication interfaces 612. Example input and output devices 604 include keyboards, keypads, gesture or graphical input devices, motion input devices, touchscreen interfaces, one or more displays, audio units, voice recognition units, vibratory devices, computer mice, and any other suitable user interface.

The processor 602 and memory 606 can include nonvolatile memory for storing computer-readable instructions, data, data structures, program modules, code, microcode, and other software components for storing the computer-readable instructions in non-transitory computer-readable mediums in connection with the other hardware components for carrying out the methodologies described herein. Software components can include source code, compiled code, interpreted code, executable code, static code, dynamic code, encrypted code, or any other suitable type of code or computer instructions implemented using any suitable high-level, low-level, object-oriented, visual, compiled, or interpreted programming language.

These and other embodiments of the systems and methods can be used as would be recognized by those skilled in the art. The above descriptions of various systems and methods are intended to illustrate specific examples and describe certain ways of making and using the systems disclosed and described here. These descriptions are neither intended to be nor should be taken as an exhaustive list of the possible ways in which these systems can be made and used. A number of modifications, including substitutions of systems between or among examples and variations among combinations can be made. Those modifications and variations should be apparent to those of ordinary skill in this area after having read this disclosure.

What is claimed is:

1. A computer-implemented method of processing a payment vehicle transaction, wherein the payment vehicle transaction is submitted by a merchant computing system, and wherein the merchant computing system is associated with a merchant, the method comprising:
   receiving, by an acquirer processor over an electronic network, transaction data from the merchant computing system, the transaction data being associated with the payment vehicle transaction at a merchant point of sale (POS) device, and a set of transaction terms and conditions of the merchant being applicable to the payment vehicle transaction;
   extracting, by the acquirer processor over the electronic network, a current set of transaction terms and conditions from a network address associated with the merchant;
   storing, by the acquirer processor, the current set of transaction terms and conditions in a terms and conditions database, the terms and conditions database being communicably coupled to the acquirer processor;

storing, by the acquirer processor, a transaction record comprising the transaction data in a transaction database, the transaction database being communicably coupled to the acquirer processor;

linking, by the acquirer processor, the stored current set of transaction terms and conditions with the stored transaction record, the linking being performed using a terms and conditions identifier, and the terms and conditions identifier being used to apply the stored current set of transaction terms and conditions to the payment vehicle transaction;

retrieving, by the acquirer processor, the stored current set of transaction terms and conditions that are linked with the stored transaction record, based on a chargeback being initiated for the payment vehicle transaction; and transmitting, by the acquirer processor, the stored current set of transaction terms to a requesting entity on behalf of the merchant.

2. The computer-implemented method of claim 1, wherein the network address is accessed in response to receiving the transaction data.

3. The computer-implemented method of claim 1, wherein the network address is accessed at least daily.

4. The computer-implemented method of claim 1, wherein the transaction data comprises the set of transaction terms and conditions.

5. The computer-implemented method of claim 1, further comprising:
receiving from the merchant a first data file, wherein the first data file includes the set of transaction terms and conditions.

6. The computer-implemented method of claim 1, further comprising:
receiving from the merchant a second data file, wherein the second data file is an updated set of transaction terms and conditions; and
subsequent to receiving the second data file, linking the updated set of transaction terms and conditions to transaction data received from the merchant computing system.

7. The computer-implemented method of claim 6, further comprising;
comparing, by the acquirer processor, the updated set of transaction terms and conditions to the stored current set of transaction terms and conditions; and
storing, by the acquirer processor to the terms and conditions database, the updated set of transaction terms and conditions upon a determination that the updated set of transaction terms and conditions is different from the stored current set of transaction terms and conditions.

8. The computer-implemented method of claim 1, wherein the acquirer processor comprises the transaction database.

9. A non-transitory computer readable medium having instructions stored thereon which when executed by a processor cause the processor to:
receive transaction data from a merchant computing system, the transaction data being associated with a payment vehicle transaction at a merchant point of sale (POS) device, and a set of transaction terms and conditions of the merchant being applicable to the payment vehicle transaction;
extract a current set of transaction terms and conditions from a network address associated with the merchant via a network;
store the current set of transaction terms and conditions in a terms and conditions database, the terms and conditions database being communicably coupled to an acquirer processor;
store a transaction record comprising the transaction data in a transaction database, the transaction database being communicably coupled to the acquirer processor;
link the stored current set of transaction terms and conditions with the stored transaction record, the linking being performed using a terms and conditions identifier, and the terms and conditions identifier being used to apply the stored current set of transaction terms and conditions to the payment vehicle transaction;
retrieve the stored current set of transaction terms and conditions that are linked with the stored transaction record, based on a chargeback being initiated for the payment vehicle transaction; and
transmit the stored current set of transaction terms to a requesting entity on behalf of the merchant.

10. The non-transitory computer readable medium of claim 9, wherein the instructions further cause the processor to access the network address in response to receiving the transaction data.

11. The non-transitory computer readable medium of claim 9, wherein the transaction data comprises the set of transaction terms and conditions.

12. The non-transitory computer readable medium of claim 9, wherein the instructions further cause the processor to:
receive from the merchant a first data file, wherein the first data file includes the set of transaction terms and conditions.

13. The non-transitory computer readable medium of claim 9, wherein the instructions further cause the processor to:
receive from the merchant a second data file, wherein the second data file is an updated set of transaction terms and conditions; and
link the updated set of transaction terms and conditions to transaction data received from the merchant computing system.

14. The non-transitory computer readable medium of claim 13, wherein the instructions cause the processor to;
compare the updated set of transaction terms and conditions to the stored current set of transaction terms and conditions; and
store, in the terms and conditions database, the updated set of transaction terms and conditions upon a determination that the updated set of transaction terms and conditions is different from the stored current set of transaction terms and conditions.

15. A system for processing a payment vehicle transaction, wherein the payment vehicle transaction is submitted by a merchant computing system, and wherein the merchant computing system is associated with a merchant, the system comprising at least one computer processor, the at least one computer processor configured to execute instructions for:
receiving, by an acquirer processor over an electronic network, transaction data from the merchant computing system, the transaction data being associated with the payment vehicle transaction at a merchant point of sale (POS) device, and a set of transaction terms and conditions of the merchant being applicable to the payment vehicle transaction;

extracting, by the acquirer processor over the electronic network, a current set of transaction terms and conditions from a network address associated with the merchant;

storing, by the acquirer processor, the current set of transaction terms and conditions in a terms and conditions database, the terms and conditions database being communicably coupled to the acquirer processor;

storing, by the acquirer processor, a transaction record comprising the transaction data in a transaction database, the transaction database being communicably coupled to the acquirer processor;

linking, by the acquirer processor, the stored current set of transaction terms and conditions with the stored transaction record, the linking being performed using a terms and conditions identifier, and the terms and conditions identifier being used to apply the stored current set of transaction terms and conditions to the payment vehicle transaction;

retrieving, by the acquirer processor, the stored current set of transaction terms and conditions that are linked with the stored transaction record, based on a chargeback being initiated for the payment vehicle transaction; and transmitting, by the acquirer processor, the stored current set of transaction terms to a requesting entity on behalf of the merchant.

16. The system of claim 15, further comprising:

receiving from the merchant a first data file, wherein the first data file includes the set of transaction terms and conditions.

17. The system of claim 15, further comprising:

receiving from the merchant a second data file, wherein the second data file is an updated set of transaction terms and conditions; and subsequent to receiving the second data file, linking the updated set of transaction terms and conditions to transaction data received from the merchant computing system.

\* \* \* \* \*